Patented Aug. 1, 1933

1,920,442

UNITED STATES PATENT OFFICE 1,920,442

PURIFICATION OF SOLUTIONS OF ZINC SALTS

Urlyn C. Tainton, St. Louis, Mo.

No Drawing. Application June 30, 1930
Serial No. 465,071

7 Claims. (Cl. 23—125)

This invention relates to a method of purifying solutions of zinc salts, more especially those to be used for electrolysis or lithopone manufacture. In these operations it is customary to treat oxidized or roasted zinc ore with an acid solution such as sulphuric acid to dissolve the zinc and then filter this solution from the undissolved residue. The solution so obtained contains, in addition to zinc, other elements such as copper, cadmium, cobalt, nickel, etc., which are usually present in zinc ores. It is necessary that these elements be removed before the solution is used for the production of electrolytic zinc or the manufacture of lithopone and it is customary to effect this removal by treatment with metallic zinc in the form of zinc dust or zinc shavings.

This treatment, however, while effective for the removal of copper, does not completely remove cadmium and has relatively little effect on cobalt and nickel if these elements are present in any considerable concentration. Another metal which is extremely detrimental to zinc electrolysis is germanium, and the treatment with zinc dust alone is practically without effect in regard to the elimination of this element.

I have found that the purification of the solution from the above mentioned elements can be brought about very rapidly and effectively by metallic zinc in the presence of tellurium. Tellurium exercises a catalytic effect on the precipitation of cobalt, nickel and germanium so that in its presence the removal of these elements can be readily effected with relatively small consumption of metallic zinc. Cadmium also can be precipitated more completely in the presence of tellurium than is possible in the ordinary way.

In illustration of the mode of applying this invention, I will describe the purification of a zinc sulphate solution derived from the leaching of a roasted zinc concentrate such as is normally employed in the manufacture of electrolytic zinc. The zinc sulphate solution containing copper, cadmium, cobalt, etc., is first heated to a temperature of about 75° C. A solution of tellurium in sulphuric acid or a solution of sodium tellurite is then added so as to give a concentration of 20 to 50 milligrams of tellurium per liter of solution. Zinc dust is then added in amount proportionate to the quantity of impurities present; normally about 4 grams of zinc dust per liter of solution will be adequate. The mixture is then agitated until it is found to be substantially free from all impurities. This normally requires about one hour. The purification is expedited by the presence of copper in solution and in case no copper is present in the solution as derived from the ore, I find it of advantage to add copper sulphate to the extent of about half a gram of copper per liter of solution precipitated. Smaller quantities may, however, be employed if the amounts of cobalt and germanium are relatively small. If desired, the tellurium may be recovered from the precipitated metal and used for the treatment of a fresh batch of solution. Instead of using a pure zinc for precipitation, it is sometimes of advantage to use an alloy of zinc with some other metal. I have found that the reaction proceeds more rapidly if the zinc used for precipitation contains, say, one percent, of tin, copper or lead. The so-called blue powder obtained in the distillation process of making zinc contains usually sufficient other elements to be quite effective.

By working in the manner above described it has been found possible to produce solutions of greater purity than could be obtained in any other way and to attain this end with the use of about one-half the quantity of zinc that is necessary for purification in the ordinary practice.

Having thus described my invention, what I claim and desire to secure by Letters Patent is—

1. The method of purifying solutions of zinc salts from elements electro-negative to zinc such as cadmium, cobalt, and germanium, which consists in bringing the solution into intimate contact with metallic zinc in the presence of tellurium supplied to the solution to further the precipitation of such elements as cadmium, cobalt and germanium.

2. The method of purifying solutions of zinc salts from elements electro-negative to zinc such as cadmium, cobalt, and germanium, which consists in bringing the solution into intimate contact with a metallic zinc alloy in the presence of tellurium added to the solution to provide a catalytic effect and thereby aid the precipitation of a metallic element such as cadmium, cobalt and germanium.

3. The method of purifying solutions of zinc salts from elements electro-negative to zinc such as cadmium, cobalt, and germanium, which consists in bringing the solution into intimate contact with metallic zinc in the presence of tellurium and copper the tellurium being supplied to the solution to provide a catalytic effect which functions in the precipitation of metals such as cadmium, cobalt and germanium, and the copper of which is relied upon to facilitate the rapidity of reactions that take place during the precipitation.

4. The method of purifying solutions of zinc salts from elements electro-negative to zinc such as cadmium, cobalt, and germanium, which consists in heating the solution to a temperature of about 75° C., adding thereto a solution of a tellurium salt, adding zinc dust to the mixed solution of zinc salts and tellurium, and then agitating the solution until it is found to be substantially free from all impurities.

5. The method of purifying solutions of zinc salts from elements electro-negative to zinc such as cadmium, cobalt, and germanium, which consists in heating the solution to a temperature of about 75° C., adding thereto a solution of a tellurium salt, adding copper sulphate to the solution, adding zinc dust to the mixed solution of zinc salts, tellurium and copper sulphate, and then agitating the solution until it is found to be substantially free from all impurities.

6. The method of purifying solutions of zinc salts from elements electro-negative to zinc such as cadmium, cobalt, and germanium, which consists in heating the solution to a temperature of about 75° C., adding thereto a solution of a tellurium salt so as to give a concentration of 20 to 50 milligrams of tellurium per liter of solution, adding zinc dust to the mixed solution of zinc salts and tellurium, and agitating the solution until it is found to be substantially free from all impurities.

7. The method of purifying solutions of zinc salts from elements electro-negative to zinc such as cadmium, cobalt, and germanium, which consists in heating the solution to a temperature of about 75° C., adding thereto a solution of a tellurium salt so as to give a concentration of 20 to 50 milligrams of tellurium per liter of solution, adding copper sulphate to the extent of about one-half gram of copper per liter of solution precipitated, adding zinc dust to the mixed solution of zinc salts, tellurium and copper sulphate, and agitating the solution until it is found to be substantially free from all impurities.

URLYN C. TAINTON.